Figure 1:
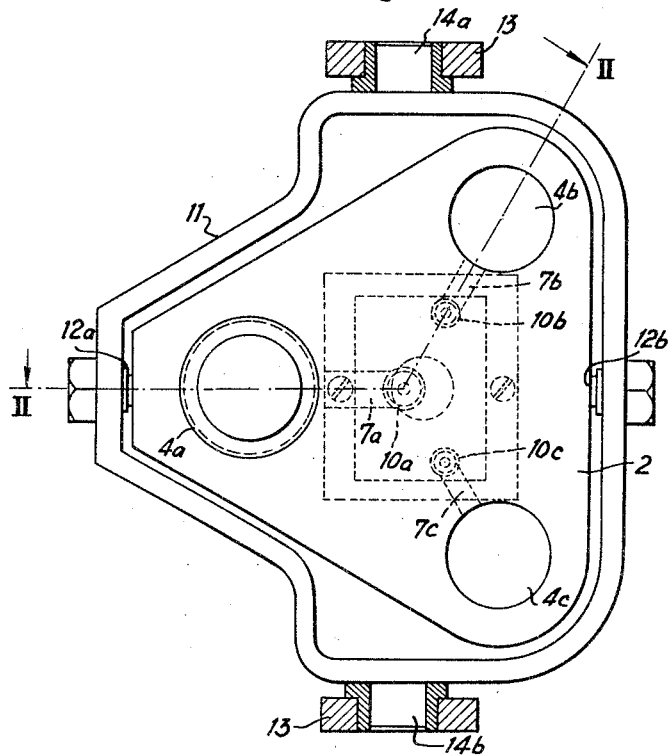

INVENTORS.
Louis Beaujard
Jacques Mondot
Marian Kapluszak

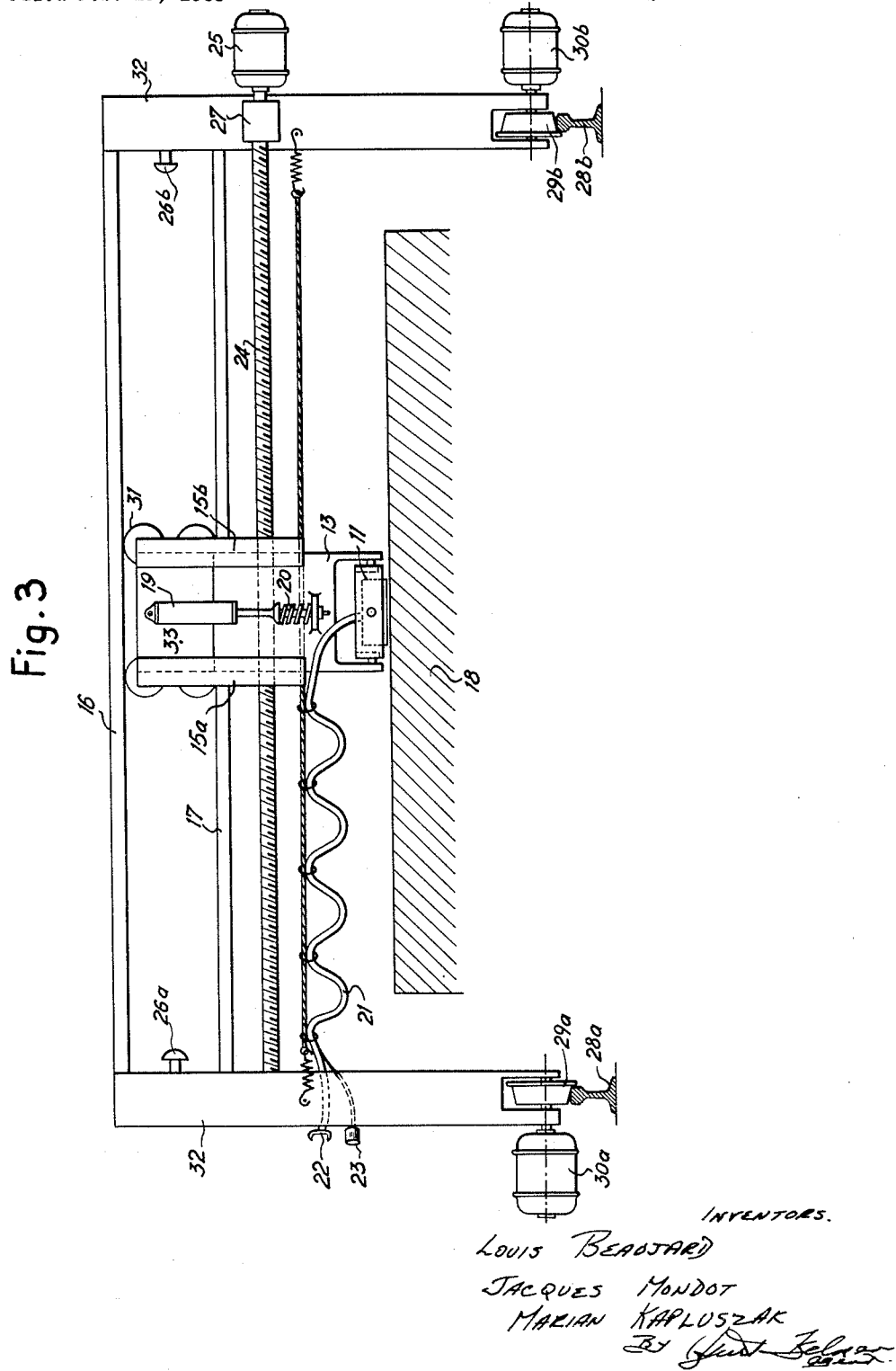

United States Patent Office 3,159,756
Patented Dec. 1, 1964

3,159,756
ULTRASONIC INSPECTION
Louis Beaujard, Jacques Mondot, and Marian Kapluszak, all of Saint-Germain-en-Laye, France, assignors to Institut de Recherches de la Siderurgie Française, Saint-Germain-en-Laye, France, a professional institution of France
Filed Feb. 19, 1963, Ser. No. 259,660
Claims priority, application France, Feb. 21, 1962, 888,713, Patent 1,322,950
9 Claims. (Cl. 310—8.7)

The present invention relates to improvements in ultrasonic inspection systems, and more particularly to a novel support for the searching units of such systems.

Systems for the inspection and acceptance-testing of solid materials, particularly metallurgical articles, by ultrasonic waves have come into wide use. In such ultrasonic flaw detection systems, difficulties frequently arise when pieces have to be tested which move in relation to the searching unit, for instance in the continuous ultrasonic testing of moving objects, such as flat stock. In such cases, searching units with rollers for support on the flat stock are usually employed. It has also been proposed to use fixed searching units and to pass the test piece in front of the fixed unit. None of these systems has proved entirely satisfactory, particularly if the surface of the test piece is irregular. With fixed searching units, acoustic contact with the test piece is very difficult to maintain.

It is the primary object of this invention to provide an improved support of the searching unit on the test piece wherein there is no solid contact between the unit and the test piece while the distance between the unit and test piece as well as the orientation of the transducer in the unit in relation to the test piece are precisely maintained.

With this and other objects in view, the invention provides a method of hydraulically supporting an ultrasonic searching unit on a test piece. The searching unit is supported on the test piece by at least three hydraulic liquid columns defining a polygon. Hydraulic liquid is caused to flow out of corresponding number of orifices in the unit to form the supporting columns for the unit and a force of pressure is applied to the searching unit in the direction of the test piece to hold the unit on the test piece and the hydraulic liquid flow through the searching unit orifices is controlled substantially independently of this force of pressure.

In ultrasonic flaw detection systems of this type, acoustic contact is established between an electro-mechanical transducer in the searching unit and the test piece by a liquid couplant caused to flow out of an opening in the searching unit directly onto the test piece and, preferably, the hydraulic liquid and the liquid couplant consists of the same liquid which, in the preferred embodiment of the invention, is water.

It will be most convenient to make this opening one of the orifices whereby the liquid couplant constitutes one of the hydraulic liquid supporting columns of the searching unit.

An ultrasonic inspection system comprises a searching unit and a liquid couplant coupling the searching unit to the test piece, the searching unit comprising a body and an end face for said body, which conforms in shape, and in operation is generally parallel, to the surface of the test piece. An electro-mechanical transducer is mounted in the body in alignment with an opening in the end face whereby an ultrasonic beam emitted by the transducer passes through the opening. The liquid couplant flows from a couplant liquid source through a conduit means directly onto the test piece through the opening to establish the acoustic contact.

According to the invention, the searching unit end face defines at least three orifices forming a polygon and conduit means connects a source of hydraulic liquid to each of the orifices whereby the hydraulic liquid flows directly onto the test piece through the orifices and thus forms a corresponding number of hydraulic liquid columns supporting the searching unit on the test piece. Control means in the conduit means maintains the pressure of the hydraulic liquid substantially constant and means is provided for applying a force of pressure on the searching unit to hold it on the test piece.

In a preferred embodiment of the system, the opening for the liquid couplant constitutes one of the orifices for the hydraulic liquid, the source of couplant liquid and the source of hydraulic liquid are constituted by a single supply of the same liquid, and the conduit means are individual conduits in the searching unit body connecting the single liquid supply to each of the orifices.

The hydraulic liquid pressure or flow control means is preferably a calibrated nozzle having a restricted passage constituting a major portion of the resistance to the flow of the hydraulic liquid from its source to the test piece. This nozzle is conveniently replaceably mounted in individual conduits of the conduit means leading to each orifice.

Figure 2:
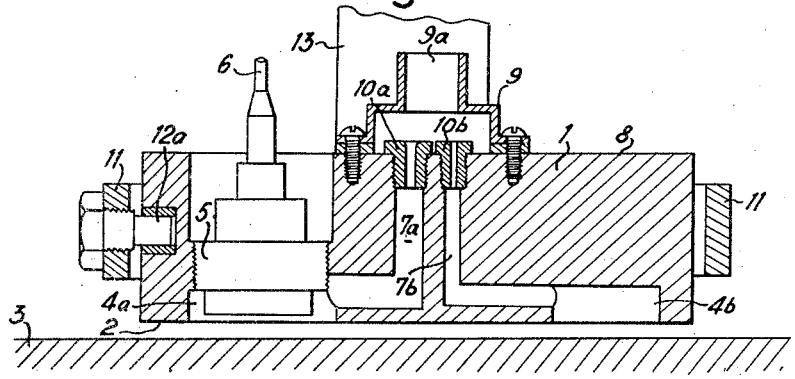

The above and other objects and features of the present invention will become more apparent in the following detailed description of one embodiment of the system, taken in conjunction with the accompanying drawing wherein
   FIG. 1 is a bottom plan view of a searching unit;
   FIG. 2 is a vertical section along line II—II of FIG. 1; and
   FIG. 3 is a side elevational view of an ultrasonic flaw detection system incorporating the searching unit of this invention.

Referring now to the drawing and first to FIGS. 1 and 2, there is shown a searching unit useful for the inspection of flat test pieces, such as flat metal stock. This searching unit is constituted essentially by a metallic body 1 which has a flat end face 2 designed to be placed parallel to, and at a slight distance of, for instance, a few tenths of a millimeter from, the flat surface of the test piece 3 during operation of the unit. As shown, the end face 2 defines three circular orifices 4a, 4b, 4c defining a triangle and permitting three supporting columns of a hydraulic liquid, such as water, to flow therethrough to support the body 1 in spaced relation to the test piece surface.

The orifice 4a serves simultaneously as a passage opening for an ultrasonic beam emitted by a conventional piezo-electric crystal transducer mounted in holder 5. The transducer holder is threadedly mounted in a bore in the searching unit body 1 and is connected with a conventional ultrasonic detector electrical unit by coaxial cable 6. Such units are well known and are fully described, for instance, in "Ultrasonic Flaw Detection," issued by the U.S. Department of Commerce, November 1958, and available through the Superintendent of Documents, U.S. Government Printing Office. Since the invention is not concerned with this aspect of the system, the electrical circuit elements connected to coaxial cable 6 have not been illustrated.

The area of the orifies through which the hydraulic liquid flows is equal so that, if the liquid is delivered thereto at an equal pressure, the same amount of liquid will flow through each orifice. In this manner, the searching unit will be supported on the test piece with its end face parallel to the test piece surface under all circumstances.

Since, in the illustrated and preferred embodiment of the present invention, the orifice 4a also serves as the opening for the ultrasonic beam and the largest part of its outlet area is, therefore, occupied by the transducer holder 5, the diameter of circular orifice 4a is larger than that of circular orifices 4b and 4c so that the annular area through which liquid flows through orifice 4a is about equal to the area of orifices 4b and 4c.

A source of liquid is connected to the orifices by suitable conduit means to supply couplant liquid and hydraulic liquid, preferably water, to the orifices, the liquid flowing through the orifices directly onto the test piece to couple the searching unit and the test piece acoustically and to support the unit on the test piece surface hydraulically. In the illustrated embodiment, the hydraulic liquid column flowing through orifice 4a also constitutes the liquid couplant so that a single source of liquid is provided. This is shown to be a reservoir 9 bolted to the top 8 of searching unit body 1 and receiving a liquid under a suitable pressure through supply conduit 9a. The liquid may be pumped or otherwise delivered to the reservoir under the desired head from any suitable supply (not shown), a useful water pressure being, for instance, 4 kg./sq. cm. The water reservoir 9 feeds the water to each orifice by individual conduits 7a, 7b, 7c constituted by bores in body 1 leading to the orifices. Calibrated nozzles 10a, 10b, 10c, are threadedly mounted in the respective feed conduits. The nozzles have restricted passages constituting a major portion of the resistance to the flow of the hydraulic liquid from the liquid source to the test piece. In this manner, the liquid flow is controlled substantially independently of the conditions of support of the searching unit on the test piece and maintained substantially constant regardless of such conditions. Since the nozzles are replaceably mounted in the conduits, the loss of pressure in the hydraulic liquid may be readily adjusted by changing the nozzles to differently calibrated nozzles. This permits ready adjustment of the desired parameter of liquid flow so as to change the distance between the end face 2 and the surface of the test piece 3 while maintaining the delivery pressure of the hydraulic liquid constant.

For instance, in order to test materials having a rough surface, such as billets, for instance, it has been found that a rate of flow of 5.3 gallons per minute of hydraulic fluid is necessary.

If the pressure of said hydraulic fluid is 2.5 kg. per square centimeter, said rate of flow is obtained with calibrated nozzles 15 millimeters in length and 3 millimeters in internal diameter.

In case the material to be tested has a smooth surface, for instance when testing cold rolled strips, a smaller rate of flow, of about 2.65 gallons per minute would be enough. In that case the calibrated nozzles would have a smaller cross-sectional area in order to reduce the rate of flow and nozzles 15 millimeters in length and 2.2 millimeters in internal diameter would be convenient.

While the supporting arrangement has been illustrated in an embodiment wherein the opening for the ultrasonic beam forms one of the orifices for the hydraulic fluid, this is obviously not essential. A special opening may be provided in the end face, if desired, and the liquid couplant delivered to this opening may be the same as the hydraulic liquid delivered to the orifices or it may be a different liquid. In either event, water will be the most useful liquid for the couplant as well as for the hydraulic support columns in the flaw detection of metallic objects.

Also, while the testing of a flat surfaced test piece has been described and illustrated, the present invention may also be used in systems for ultrasonically inspecting test pieces which do not have a plane surface of sufficient dimensions, such as bands or trusses. The end face 2 of the searching unit body 1 would then have a corresponding curvature or other shape conforming to that of the test piece surface. The illustrated unit may be readily adapted for this purpose by mounting on the flat end face 2 an intermediate component having one flat face in contact with end face 2 and a curved face conforming to the test piece surface and having orifices corresponding to those in the end face 2. In this case, it is important to watch that the thickness of the liquid couplant between the transducer and the test piece does not create false echoes.

The searching unit body 1 is universally mounted to enable its proper positioning in relation to the test piece surface. The illustrated mounting includes a support frame 11 and pivoting pins 12a, 12b supporting the body 1 on the frame for pivotal movement about a first horizontal pivoting axis. The support frame, in turn, is pivotally mounted on yoke 13 by pins 14a, 14b for pivotal movement of the support frame about a second horizontal pivoting axis perpendicular to the first pivoting axis.

FIG. 3 illustrates an automatic ultrasonic flaw detection system for slabs, incorporating the searching unit of FIGS. 1 and 2 universally mounted on support frame 11 and yoke 13. The yoke 13 is mounted for free vertical gliding movement in guide members 15a, 15b which are mounted on a carriage 33 having wheels 31 running on transverse rails 16 and 17 for movement of the searching unit transversely of the test piece 18. A force of pressure is applied to the searching unit body by compression spring 20 exerting a downward pressure on the body to hold it on the test piece. A pneumatically operated cylinder 19 connects the searching unit support yoke to the carriage 33 so that the unit may be lifted when the system is idle and lowered when the system is in use. The compression spring, which is mounted between the cylinder piston and an abutment on the yoke, will exert the necessary pressure on the searching unit to hold it at the required distance from the test piece surface, this distance being determined by the excess of the hydraulic pressure applied through orifices 4a, 4b, 4c over the spring pressure. This spring may be omitted, if desired, in which case, the force of gravity or the weight of the searching unit will serve as the force of downward pressure holding the unit on the test piece.

The liquid is supplied to the searching unit through a flexible hose 21 connected to a coupling 22 in a pipe system for the supply of the liquid. The electro-mechanical transducer is connected to the ultrasonic generator and indicating circuit by a coaxial cable having a suitable plug 23.

In FIG. 3, the slab 18 to be inspected is shown in its width, its longitudinal axis extending perpendicularly to the plane of the drawing. A transverse screw 24 is journaled in a pair of vertical beams 32, 32 and passes through correspondingly threaded bores in guide members 15a and 15b. An electric motor 25 is coupled to the screw and operation of the motor will turn the screw in either direction to move the searching unit transversely of the test piece to explore its entire width, contacts 26a and 26b being mounted on beams 32 to limit the transeverse movement of the searching unit and causing the rotational direction of motor 25 to be reversed upon actuation of the contacts by the carriage traveling on rails 16 and 17. At each movement reversal, an electric brake 27 rapidly stops the motor. The vertical beams are supported by wheels 29a, 29b on rails 28a, 28b which run parallel to the length of the test piece 18. Electric motors 30a, 30b turn wheels 29a, 29b at a constant speed.

In this manner, the searching unit carries out a rapid transverse sweeping movement over the surface of the test piece while moving slowly along the longitudinal axis of the test piece.

The system of the present invention is of particular advantage when the searching unit is subject to two simultaneous orthogonal movements, as illustrated in FIG. 3. When the searching unit is supported on the test piece by means of rollers or wheels, it is impossible to avoid lateral scraping or scratching during such movements. In contrast to this, the floating unit of the present invention may be displaced on the test piece in any direction without appreciable effort and without friction which may cause an unwanted inclination of the transducer.

Such a system also produces considerable improvements if the test piece surface is rough, irregular or covered with an oxide coating, which is generally the case with metallurgically produced objects. The hydraulic support automatically maintains the predetermined distance and the parallel relationship between the end face of the searching unit and the surface of the test piece. Under the influence of the flow of the hydraulic supporting liquid, the floating of the searching unit on the test piece is self-regulated. With a minimum of three support columns forming a polygon, the searching unit is securely supported on the test piece and the hydraulic liquid flow may be maintained at a value substantially independent of the distance between the test piece surface and the searching unit end face. This may be simply attained by feeding the hydraulic liquid to the orifices through individual restricted passages of a length and diameter so designed that they contribute to a large extent to the loss of pressure or the resistance to the flow of the liquid to the orifices. In this manner, an accidental reduction of the distance between the searching unit end face and the test piece surface produces a noticeable increase in the liquid pressure which tends to reestablish the original distance. This distance, therefore, is essentially determined only by the thickness of the liquid film or column between the end face and the surface, i.e., the liquid flow to the orifices.

The support works simply and will keep the searching unit end face at a desired distance from the test piece surface in the same proportion as the maximal hydraulic pressure exceeds the force of the downward pressure applied to hold the searching unit on the test piece. As soon as the hydraulic pressure falls below this force, the searching unit will rest on the test piece and the liquid flow will stop. This downward pressure may be exerted simply by the weight of the searching unit if the test piece surface is horizontal or substantially horizontal.

This type of support produces good acoustic contact as well as a self-regulating support wherein the searching unit floats on liquid columns without any mechanical contact between the searching unit end face and the test piece surface, eliminating friction and making easy and rapid sweeping of the searching unit over the test piece possible.

While the invention has been particularly described in connection with a preferred embodiment, it will be clearly understood that many variations and modifications may occur to the skilled in the art without departing from the spirit and scope of this invention as defined by the appended claims.

What is claimed is:

1. In an ultrasonic testing arrangement, in combination;
   (a) a searching unit including means for emitting an ultrasonic beam from said unit in a predetermined direction toward an object to be tested;
   (b) hydraulic means for establishing at least three spaced columns of hydraulic liquid flowing from said unit in said direction for engagement with said test piece, said columns defining a polygon, said columns exerting hydraulic pressure on said searching unit in a direction opposite to said predetermined direction;
   (c) pressure means for urging said searching unit in said predetermined direction against said hydraulic pressure; and
   (d) control means for controlling the rate of liquid flow in said columns.

2. In an arrangement as set forth in claim 1, means for maintaining a body of liquid extending from said searching unit toward said object, said beam passing through said body of liquid.

3. In an arrangement as set forth in claim 2, one of said columns constituting said body of liquid.

4. In an ultrasonic system for inspecting a test piece: a searching unit and a liquid couplant coupling the searching unit to the test piece, said unit comprising a body, an end face for said body and adapted to face the test piece, the end face defining at least three orifices forming a polygon, electro-mechanical transducer means mounted in said body in alignment with an opening in the end face for emitting an ultrasonic beam outward through said opening, a source of couplant liquid, a conduit means connecting the couplant liquid source to the opening whereby the liquid couplant flows directly onto the test piece through the opening and thus establishes acoustic contact between the transducer and the test piece, a source of hydraulic liquid, conduit means connecting the hydraulic liquid source to each one of said orifices, control means in said conduit means for maintaining the rate of flow of the hydraulic fluid substantially constant, and means applying a force of pressure on the searching unit to hold it on the test piece.

5. The ultrasonic inspecting system of claim 4, wherein the couplant liquid and the hydraulic liquid are water.

6. The ultrasonic inspecting system of claim 4, wherein said opening constitutes one of said orifices, the source of couplant liquid and the source of hydraulic fluid are constituted by a single supply of the same liquid, and the conduit means are individual conduits in said body connecting the single liquid supply to each of said orifices.

7. The ultrasonic inspecting system of claim 4, wherein said control means is a calibrated nozzle having a restricted passage constituting a major portion of the resistance to the flow of the hydraulic liquid from said source to the test piece.

8. The ultrasonic inspecting system of claim 7, wherein said calibrated nozzle is replaceably mounted in individual conduits of said conduit means leading to each of said orifices.

9. The ultrasonic inspecting system of claim 4, wherein the area of the orifices through which the hydraulic liquid flows is about equal.

References Cited by the Examiner
UNITED STATES PATENTS

| | | | |
|---|---|---|---|
| 2,956,185 | 10/60 | Von Stocker | 310—8.7 |
| 2,957,092 | 10/60 | Cline et al. | 310—8.7 |
| 2,992,553 | 7/61 | Joy | 310—8.3 |

MILTON O. HIRSHFIELD, *Primary Examiner.*